Dec. 8, 1936.  D. COOK  2,063,793

CENTRALIZED AUTOMOBILE DRIVING CONTROL

Filed April 29, 1935

Delbert Cook, INVENTOR

BY *Victor J. Evans & Co.*
ATTORNEY

WITNESS

Patented Dec. 8, 1936

2,063,793

UNITED STATES PATENT OFFICE 2,063,793

CENTRALIZED AUTOMOBILE DRIVING CONTROL

Delbert Cook, Farmingdale, N. J.

Application April 29, 1935, Serial No. 18,919

3 Claims. (Cl. 192—.01)

This invention relates to a centralized automobile driving control and has for the primary object the provision of a device of this character which will simplify the driving and controlling of an automobile over the present method of providing independent pedals or controls for the accelerator, brake and clutch of an automobile and will be readily adaptable to an automobile while in the course of manufacture or to an automobile now in use and of late type.

Another object of this invention is the provision of a single movably mounted pedal or treadle conveniently located to the driver and having means for connecting it to the carbureter control of the automobile and to the brake and clutch mechanisms of said automobile, whereby the driver may in the customary manner actuate the carbureter control with a toe movement of one foot and with a heel movement of the same foot first to disengage the clutch for the shifting of gears or to provide free wheeling to the automobile and with a further heel movement apply the brake for slowing down or stopping of the automobile, while still holding the clutch disengaged.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation partly in section illustrating a centralized automobile driving control constructed in accordance with my invention.

Figure 1:
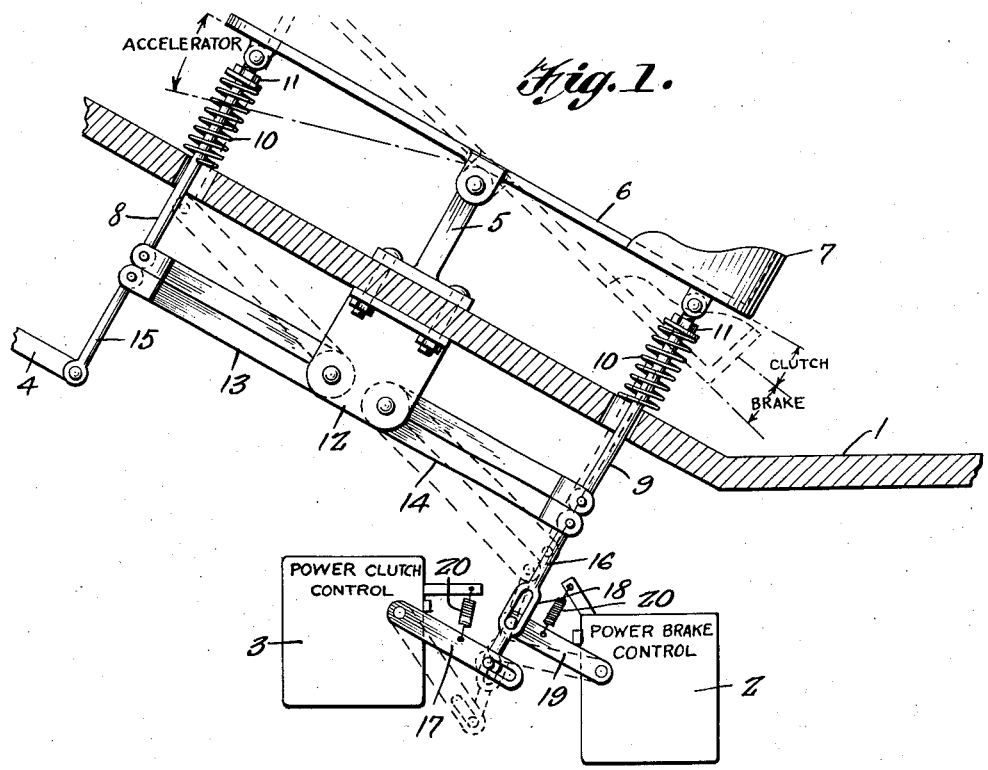

Referring in detail to the drawing, the numeral 1 indicates the floor or toe boards of an automobile to which my invention is installed. Also shown in Figure 1 of the drawing is a power brake control 2, a power clutch control 3 and linkage 4 connecting my invention to a carbureter control of the automobile. The parts described are conventional and my invention is readily adaptable thereto.

A bracket 5 is mounted to the toe or floor board 1 and pivotally supports a pedal or treadle 6 for rocking motion by the foot of the driver of the automobile, a suitable heel plate 7 being formed integrally with one end portion of the treadle or pedal, the opposite end portion being known as the toe portion. As shown by dotted lines in Figure 1, the pedal or treadle may be rocked into several positions and the downward movement of the toe portion advances the carbureter control towards open position for accelerating the speed of the engine of the automobile and an upward movement of said toe portion closes the carbureter control. Rods 8 and 9 are pivoted to the pedal or treadle and extend through openings in the toe or floor board 1. The rod 8 is located adjacent the toe portion of the treadle or pedal while the rod 9 is located adjacent the heel portion and mounted upon said rods 8 and 9 and interposed between the floor board 1 and the pedal or treadle are coil springs 10 acting to restore the pedal or treadle to its normal position when freed of manual force. One end of each spring 10 engages a nut 11, the purpose of which is to vary the action or tension of the spring and by adjusting the springs as to their actions the neutral position of the pedal or treadle may be varied.

Figure 2:
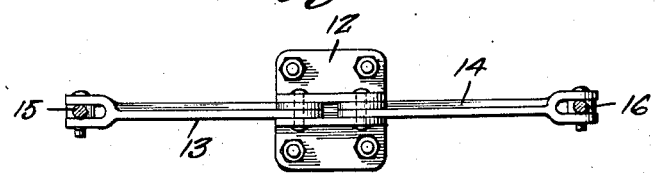
Figure 2 is a plan view, partly in section, illustrating linkage forming part of the present invention.
Figure 3:
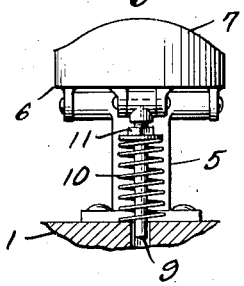
Figure 3 illustrates one end of the device showing spring means for neutralizing or the repositioning of the parts of the device when relieved of manual force.
Figure 4:
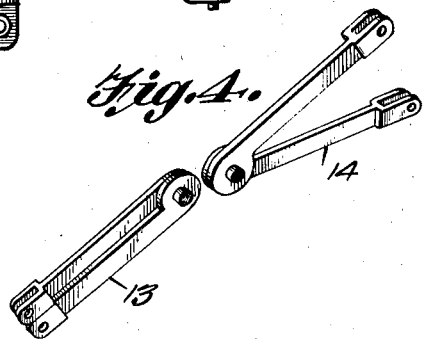
Figure 4 is a perspective view illustrating parts of the linkage.

Secured to the floor board 1, directly under the bracket 5 is a bracket 12 and pivoted to said bracket are companion pairs of arms 13 and 14. One arm of the pair of arms 13 is pivoted to the rod 8 and the other arm of said pair is pivoted to a link 15 which is in turn pivoted to the linkage 4. One arm of the pair of arms 14 is pivoted to the rod 9 and the other arm of said pair is pivoted to a link 16, one end of which is pivoted and slidably connected to the control arm 17 of the power clutch control mechanism 3. The link 16 has a pin and slot connection 18 with a control arm 19 of the power brake control mechanism 2. The control arms 17 and 19 have connected thereto springs 20 acting to restore the control arms in position to render said power clutch and brake controls inoperative when the pedal or treadle is relieved of manual force. The arms of the pairs of arms 13 and 14 are superimposed, as clearly suggested in Figures 2 and 4 of the drawing. While I have shown and described connections between the arms 13 and 14 with the linkage 4 of the carbureter control and the power clutch control and power brake control, it is to be understood that these connections may be varied for the purpose of adapting my invention to different makes of automobiles.

In operation, the driver of the motor vehicle places a foot upon the treadle or pedal and to control the speed of the engine of the automobile the toe portion is depressed and raised as usual in automobiles equipped with a pivotally mounted accelerator pedal. To disengage the cluch the heel portion of the pedal or treadle 6 is moved into dotted line position denoted by the word "clutch" in Figure 1. This brings about an operation of the power clutch control to disengage the clutch so that the gear changing of the automobile may be brought about as usual or to disengage the clutch for the purpose of obtaining free wheeling of the automobile. The pin and slot connection 18 at this time permits the power brake control to remain idle or in non-brake applying position. To apply the brakes of the automobile, the heel portion of the pedal or treadle 6 is depressed further into the position denoted by the word "brake" in Figure 1, bringing about the operation of the car brake control, thereby retarding the speed of the automobile or bringing the latter to a stop. During the operation of the power clutch control and also the power brake control by a downward movement of the heel portion of the pedal or treadle it will be seen that the arms 13 prevent movement of the carbureter control. This also applies to the power clutch control and power brake control when the toe portion of the treadle or pedal is depressed for accelerating the speed of the engine of the automobile, this latter operation being taken care of by the arms 14.

From the foregoing description taken in connection with the accompanying drawing, it will be seen that a very efficient, practical and durable centralized automobile driving control has been provided wherein the carbureter throttle control, clutch and brakes of the automobile may be successfully actuated by the movements of one foot on one pedal instead of two feet on two or three pedals as is customary. With this invention all that is necessary to stop a car, suddenly or otherwise, is one downward motion of the heel by which single motion the throttle is closed, the clutch disengaged and the brakes applied.

Having described the invention, I claim:

1. In combination with clutch, brake and throttle controls of an automobile, a fulcrum secured to the automobile, a treadle pivoted to said fulcrum, rods connected to said treadle at opposite sides of the fulcrum, spring means on said rods to neutralize the position of the treadle on the fulcrum, a bracket secured to the automobile, pairs of arms pivoted to said bracket and the arms of said pairs of arms being arranged in superimposed relation and one arm of each pair connected to said rods, and means connecting the other arms of said pairs of arms to the throttle control, clutch control and brake control whereby the throttle control may be actuated independently of said clutch and brake controls and permitting actuation of said cluch and brake controls by the pedal without the actuation of the throttle control.

2. A centralized automobile driving control comprising, a pivotally mounted pedal, pairs of pivotally mounted arms and the arms of each pair being arranged in superimposed relation, means connecting the upper arms of each pair of arms to said pedal, means connecting the lower arm of one of said pair of arms to a throttle, and means connecting the lower arm of the other pair of arms to clutch and brake controls.

3. A centralized automobile driving control comprising, a pivotally mounted pedal, pairs of arms pivotally mounted and the arms of each pair being arranged in superimposed relation, means connecting the upper arms of each pair of arms to said pedal, means connecting the lower arm of one of said pair of arms to a throttle, means connecting the lower arm of the other pair of arms to clutch and brake controls, and spring means for neutralizing the position of said pedal.

DELBERT COOK.